(12) United States Patent
Saito et al.

(10) Patent No.: US 12,255,506 B2
(45) Date of Patent: Mar. 18, 2025

(54) CONDUCTOR FORMING APPARATUS AND CONDUCTOR FORMING METHOD

(71) Applicant: HONDA MOTOR CO., LTD., Tokyo (JP)

(72) Inventors: Mikito Saito, Tokyo (JP); Ryosuke Fukuchi, Tokyo (JP)

(73) Assignee: HONDA MOTOR CO., LTD, Tokyo (JP)

( * ) Notice: Subject to any disclaimer, the term of this patent is extended or adjusted under 35 U.S.C. 154(b) by 94 days.

(21) Appl. No.: 18/459,431

(22) Filed: Sep. 1, 2023

(65) Prior Publication Data

US 2024/0097538 A1    Mar. 21, 2024

(30) Foreign Application Priority Data

Sep. 16, 2022 (JP) ................. 2022-147774

(51) Int. Cl.
*H02K 15/04* (2025.01)
*H02K 15/043* (2025.01)

(52) U.S. Cl.
CPC ................. *H02K 15/0433* (2025.01)

(58) Field of Classification Search
CPC ...... H02K 3/04; H02K 15/0433; H02K 15/04; A61K 40/4248
See application file for complete search history.

(56) References Cited

U.S. PATENT DOCUMENTS 8,056,215 B2 * 11/2011 Takada ............... H02K 15/0433
242/365.8
8,671,555 B2 * 3/2014 Kamatani ......... H02K 15/0433
29/605

FOREIGN PATENT DOCUMENTS

JP         2021058076 A      4/2021

* cited by examiner

*Primary Examiner* — Leda T Pham
(74) *Attorney, Agent, or Firm* — CKC & PARTNERS.CO., LLC

(57) ABSTRACT

A conductor forming apparatus that forms a wave winding coil group by folding a conductor, in which the conductor forming apparatus includes: a folding jig that is arranged on an inside of a folding direction of the conductor, the folding jig including a support plate with a tip serving as a starting point for folding the conductor, and a plurality of guide protrusions arranged on a side of the tip of the support plate so as to hold the conductor before folding from both sides in a width direction, the plurality of guide protrusions each including a guide surface that can guide a folding operation of the conductor from the start of folding.

8 Claims, 17 Drawing Sheets

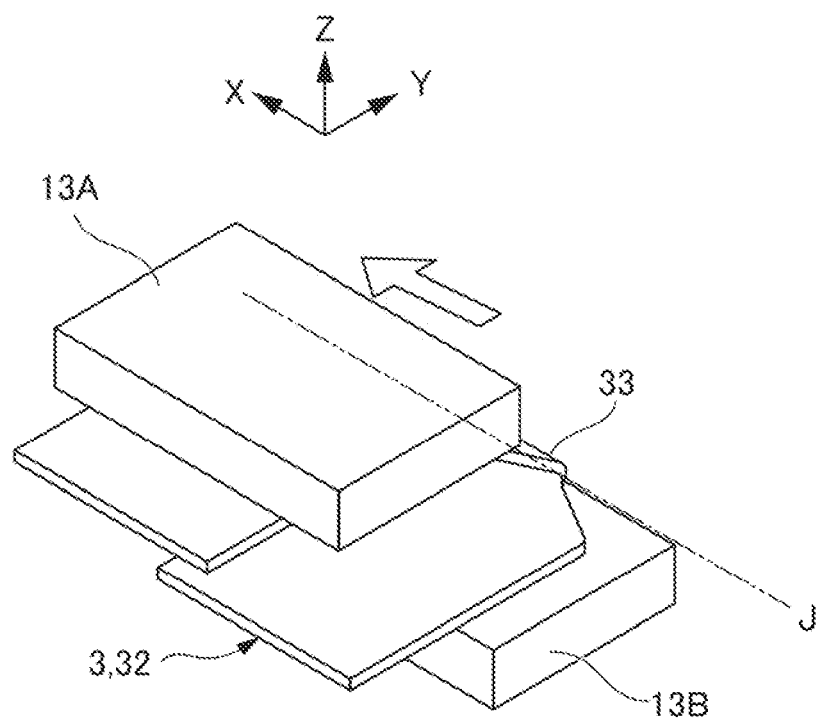

CONDUCTOR FORMING APPARATUS AND CONDUCTOR FORMING METHOD

This application is based on and claims the benefit of priority from Japanese Patent Application No. 2022-147774, filed on 16 Sep. 2022, the content of which is incorporated herein by reference.

BACKGROUND OF THE INVENTION

Field of the Invention

The present invention relates to a conductor forming apparatus and a conductor forming method.

Related Art

Conventionally, a conductor forming apparatus has been known, which forms a wave winding coil group including a straight part and a mountain-shaped turn part by folding at least two conductors running in parallel (see, for example, Patent Document 1).

The conventional conductor forming apparatus has a wedge-shaped folding jig inserted into the inside of the folding direction when folding the conductor. The tip of the folding jig is provided with protrusions that sandwich the top of the turn part formed by folding the conductor. The protrusions sandwich the top from both sides in the width direction, whereby functioning to restrict the extension of the top in the width direction.

Patent Document 1: Japanese Unexamined Patent Application, Publication No. 2021-58076

SUMMARY OF THE INVENTION

However, the folding jig of the conventional conductor forming apparatus has a configuration, in which the top of the turn part after folding the conductor is sandwiched by the protrusions, leaving room for improvement from the viewpoint of suppressing twisting of the conductor, before forming the top or from the start of folding the conductor.

The purpose of the present invention is to provide a conductor forming apparatus and a conductor forming method, which can guide a folding operation of the conductor from the start of folding and can form a high-quality wave winding coil group, in which twisting of the conductor is suppressed.

(1) The conductor forming apparatus according to the present invention is a conductor forming apparatus (such as conductor forming apparatus 1 to be described later) that forms a wave winding coil group (such as wave winding coil group 4 to be described later) by folding a conductor (such as conductor 3 to be described later), in which the conductor forming apparatus includes: a folding jig (such as folding jig 2 to be described later) that is arranged on an inside (such as inside D to be described later) of a folding direction of the conductor, and in which the folding jig includes a support plate (such as support plate 21 to be described later) with a tip (such as tip 211 to be described later) serving as a starting point for folding the conductor, and a plurality of guide protrusions (such as guide protrusions 22 to be described later) arranged on a side of the tip of the support plate so as to hold the conductor before folding from both sides in a width direction (such as X direction to be described later), the plurality of guide protrusions each including a guide surface (such as guide surface 221 to be described later) that can guide a folding operation of the conductor from the start of folding.

(2) In the conductor forming apparatus described in (1), the guide surface of the guide protrusion is preferably substantially circular.

(3) In the conductor forming apparatus described in (2), an outer peripheral edge (such as outer peripheral edge 221a to be described later) of the guide surface of the guide protrusion is preferably chamfered or rounded.

(4) In the conductor forming apparatus described in any one of (1) to (3), the tip of the support plate is preferably chamfered or rounded.

A conductor forming method of forming a wave winding coil group (such as wave winding coil group 4 to be described later) by folding a conductor (such as conductor 3 to be described later), in which the method includes: arranging a folding jig (such as folding jig 2 to be described later) on an inside (such as inside D to be described later) of a folding direction of the conductor, in which the folding jig includes a support plate (such as support plate 21 to be described later) with a tip (such as tip 211 to be described later) serving as a starting point for folding the conductor, and a plurality of guide protrusions (such as guide protrusions 22 to be described later) arranged on a side of the tip of the support plate so as to hold the conductor before folding from both sides in a width direction (such as X direction to be described later), the plurality of guide protrusions each including a guide surface (such as guide surface 221 to be described later) that can guide a folding operation of the conductor from the start of folding; and folding the conductor with the tip of the support plate as a starting point, and guiding the folding operation of the conductor from the start of folding by the guide surface of the guide protrusion.

(6) In the conductor forming method described in (5), the guide surface (such as guide surface 221 to be described later) of the guide protrusion to hold the conductor may be substantially circular.

(7) In the conductor forming method described in (6), an outer peripheral edge (such as outer peripheral edge 221a to be described later) of the guide surface of the guide protrusion may be chamfered or rounded.

(8) In the conductor forming method described in any one of (5) to (7), the tip of the support plate may be chamfered or rounded.

The present invention can provide a conductor forming apparatus and a conductor forming method, which can guide the conductor folding operation from the start of folding and can form a high-quality wave winding coil group, in which twisting of the conductor is suppressed.

BRIEF DESCRIPTION OF THE DRAWINGS

FIG. 12E is a schematic diagram illustrating the state of forming a turn part by further moving the folded conductor in the parallel direction;

DETAILED DESCRIPTION OF THE INVENTION

Figure 1:
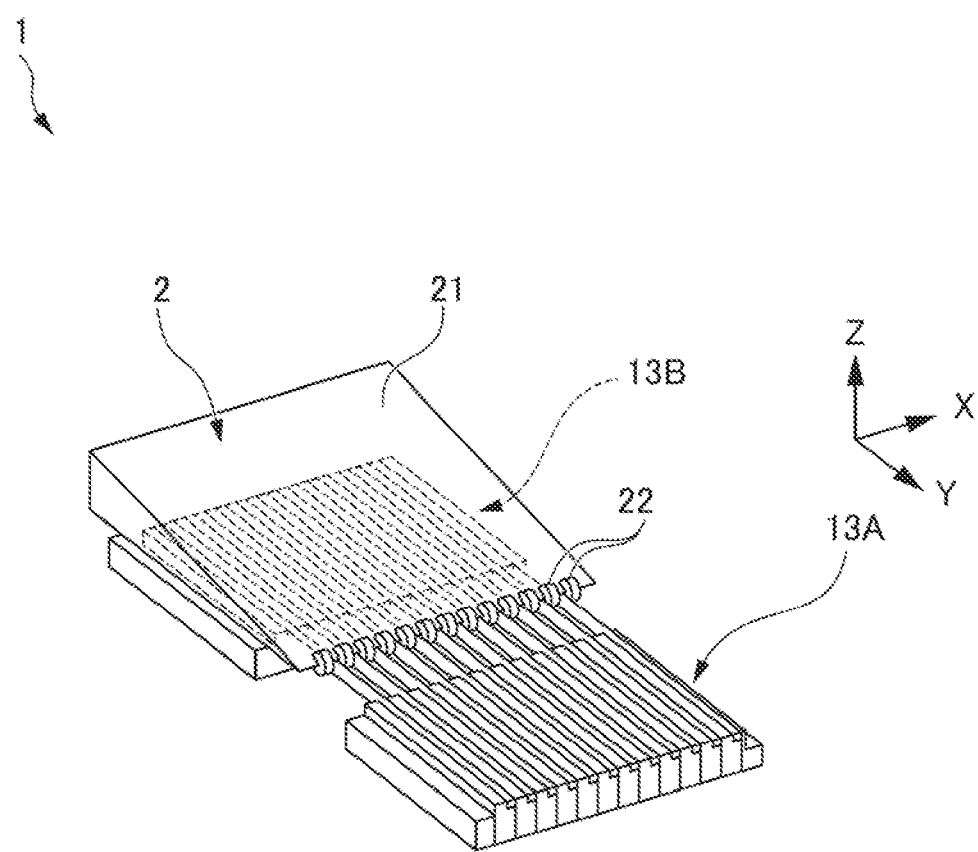
FIG. 1 is a perspective view illustrating the main part of a conductor forming apparatus.

Hereinafter, the conductor forming apparatus and the conductor forming method of the present disclosure will be described with reference to the drawings. As illustrated in FIG. 1, the conductor forming apparatus 1 includes a pair of holding parts 13A, 13B (hereinafter referred to as the first holding part 13A and the second holding part 13B) that hold a plurality of conductors (not illustrated), and one folding jig 2.

Here, the directions of the conductor forming apparatus 1 are defined. The X direction in the drawings indicates the width direction of the conductor forming apparatus 1. The X direction is also the width direction of the conductor and the parallel direction of the plurality of parallelly arranged conductors (to be described later). The Y direction in the drawings indicates the depth direction of the conductor forming apparatus 1. The Y direction is also the extending direction of the straight part of the conductor and the folding direction of the conductor (to be described later). The Z direction in the drawings indicates the height direction of the conductor forming apparatus 1.

Figure 2:
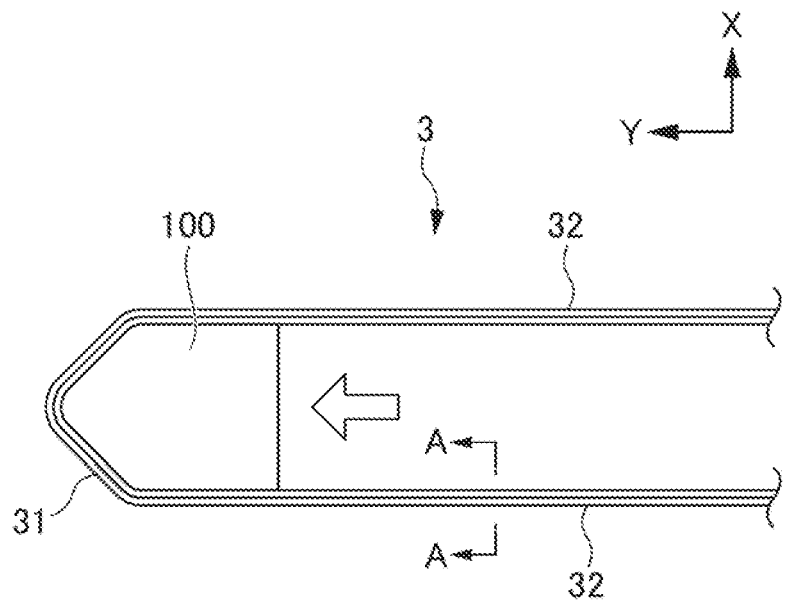
FIG. 2 is a diagram illustrating a conductor formed by the conductor forming apparatus.
Figure 3:
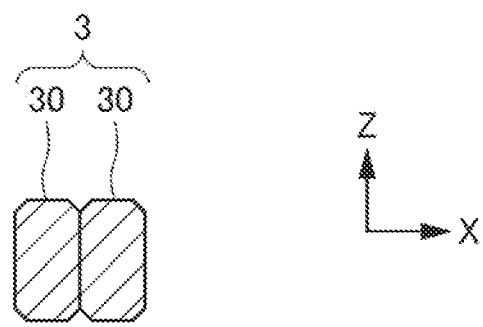
FIG. 3 is a cross-sectional view taken along the line A-A in FIG. 2.

The conductor will be described with reference to FIGS. 2 to 4. The conductor 3 is a coil wire that constitutes a wave winding coil. As illustrated in FIG. 3, the conductor 3 described in the present embodiment is composed of two unit wires 30, 30, each of which is made of a flat square wire such as a copper wire. However, the conductor 3 may be a single wire composed of a single unit wire 30. The two unit wires 30, 30 are arranged in the width direction of the conductor 3. The surface of the conductor 3 is covered with an insulating film made of resin (not illustrated). The conductor 3 is bent into a substantially U-shape using a drawing tool 100 that moves in the direction of the white arrow in FIG. 2. This forms a mountain-shaped turn part (first turn part) 31 and two straight parts 32, 32 extending parallel in the same direction from both ends of the turn part 31.

Figure 4:
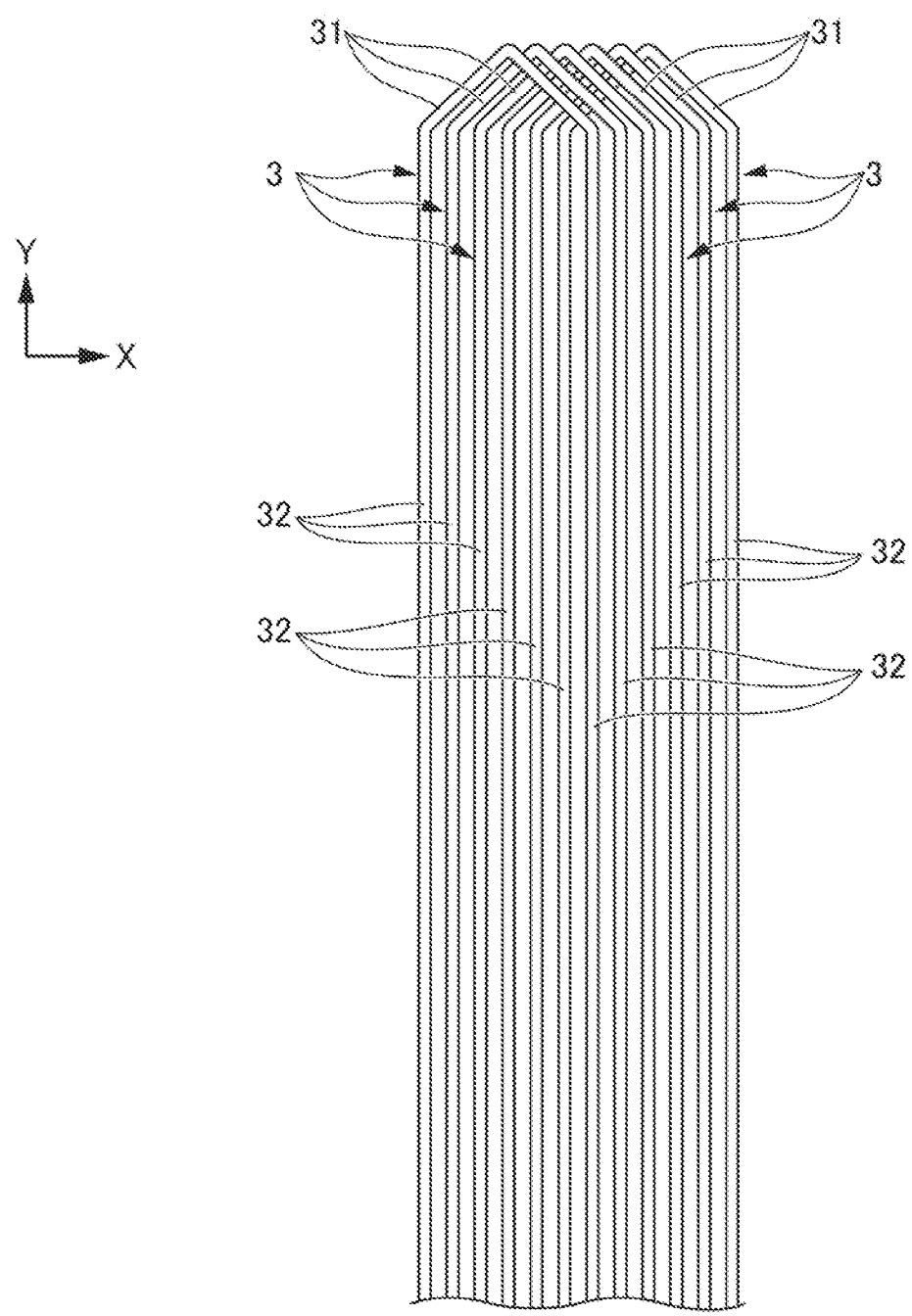
FIG. 4 is a diagram illustrating a pre-folding state where six of the conductor illustrated in FIG. 2 are arranged in parallel.

As illustrated in FIG. 4, the conductors 3, each of which is bent into a substantially U-shape, are stacked in parallel, and their positions are shifted in the width direction by a predetermined distance corresponding to the pitch of the slot of the stator core (not illustrated), in which the turn parts 31 are arranged on the same side. In the present embodiment, six conductors 3, each of which is bent into a substantially U-shape, are stacked in parallel. However, at least two conductors 3 may be stacked. Twelve straight parts 32 are arranged parallel at a predetermined distance. Although not illustrated in FIG. 1, the six parallel conductors 3 are arranged such that the turn parts 31 protrude toward the front side of the conductor forming apparatus 1 from the first holding part 13A, and the twelve straight parts 32 are held by the first holding part 13A and the second holding part 13B, whereby they are mounted on the conductor forming apparatus 1.

Figure 5:
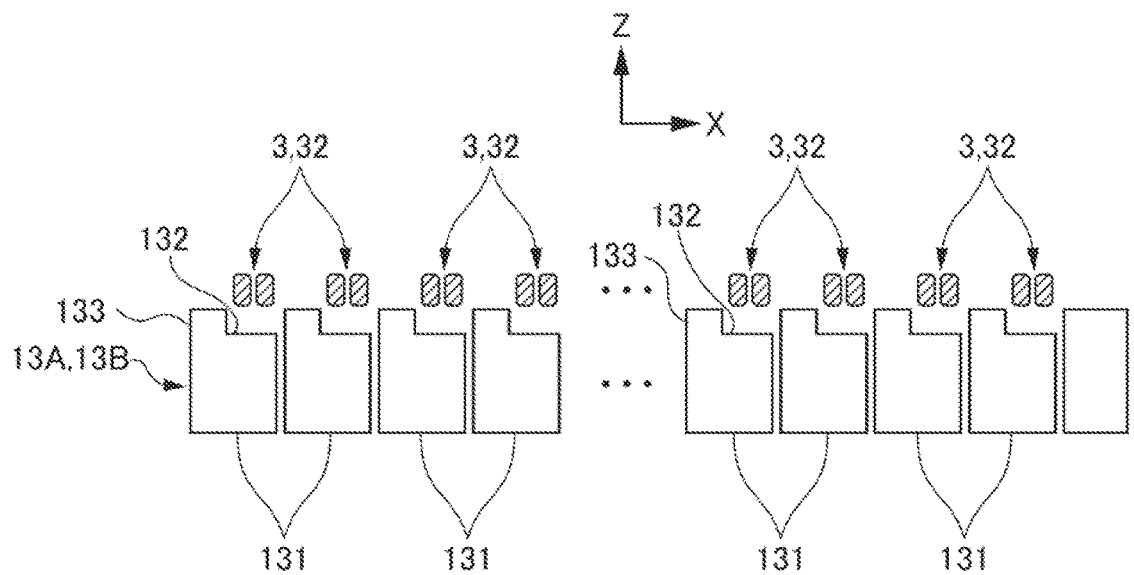
FIG. 5 is a diagram illustrating a holding part for holding the conductor, in the conductor forming apparatus.
Figure 6:
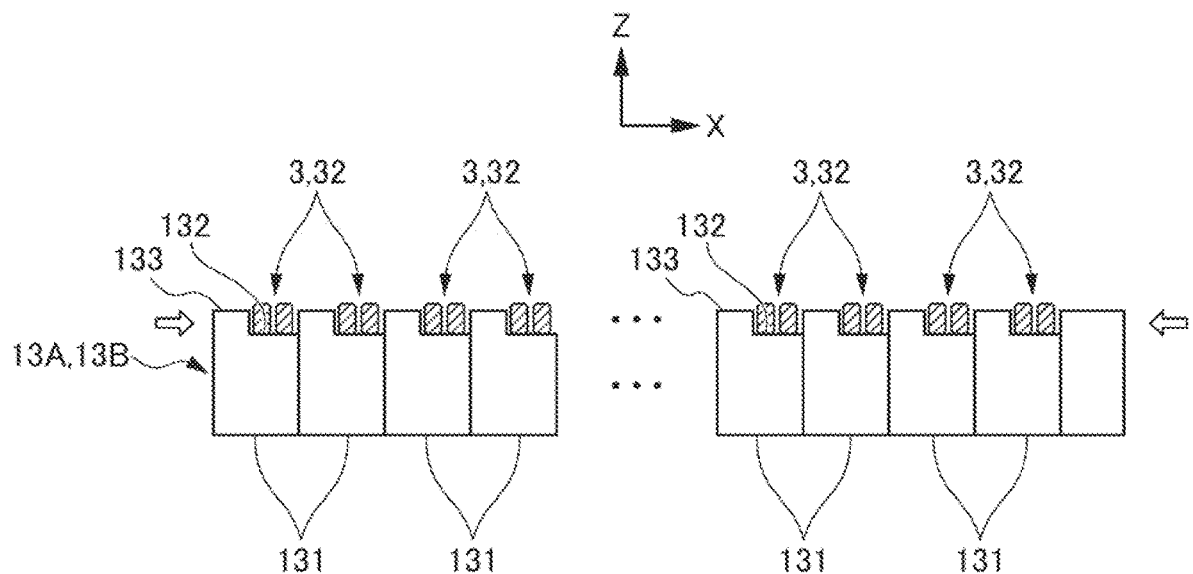
FIG. 6 is a diagram illustrating the state where the conductor is held by the holding part.

The first holding part 13A and the second holding part 13B are arranged at a predetermined distance without holding the conductor 3 in the depth direction of the conductor forming apparatus 1. The distance between the first holding part 13A and the second holding part 13B is a distance for forming a turn part in the folded conductor 3, as described later. The first holding part 13A and the second holding part 13B have substantially the same configuration and are composed of a plurality of blocks 131 arranged in the width direction of the conductor forming apparatus 1, as illustrated in FIGS. 5 and 6. The plurality of blocks 131 can be opened and closed in the width direction by an opening and closing mechanism (not illustrated). The number of the blocks 131 corresponds to the number of the straight parts 32 of the conductor 3 to be held.

A groove 132 and a clamping piece 133 are formed on the top surface of each block 131. The groove 132 is formed slightly narrower than the width (width in the X direction in FIG. 3) of the straight part 32 of the conductor 3, and extends along the depth direction (the extending direction of the straight part 32 of the conductor 3) of the conductor forming apparatus 1. The groove 132 is formed by cutting away approximately half of the top surface of the block 131, from one side to the other side in the width direction. The clamping piece 133 is formed of the remaining part of the top surface of the block 131 where the groove 132 is formed. The clamping piece 133 is arranged parallel to the groove 132 and adjacent to the groove 132, and extends along the depth direction (the extending direction of the straight part 32 of the conductor 3) of the conductor forming apparatus 1.

As illustrated in FIG. 5, when each block 131 opens so as to move away from each other by the opening and closing mechanism, the gap between the clamping pieces 133, 133 of adjacent blocks 131 becomes wider than the width of the straight part 32 of the conductor 3. As a result, the first holding part 13A and the second holding part 13B can accommodate or remove the straight part 32 of the conductor 3 in or from each groove 132. On the other hand, as illustrated in FIG. 6, when each block 131 closes so as to come into close contact with each other by the opening and closing mechanism, the gap between the clamping pieces 133, 133 of adjacent blocks 131 becomes slightly narrower than the width of the straight part 32 of the conductor 3. As a result, the first holding part 13A and the second holding part 13B clamp and hold the straight part 32 of the conductor 3, which is accommodated in each groove 132, by the clamping pieces 133, 133 of adjacent blocks 131.

Among the first holding part 13A and the second holding part 13B in FIG. 1, the first holding part 13A arranged on the front side can be rotated between the open position and the folded position by a folding moving mechanism (not illustrated). As illustrated in FIG. 1, the open position is a position where the first holding part 13A is arranged in parallel with the second holding part 13B in the depth direction of the conductor forming apparatus 1. The folded position is a position where the first holding part 13A is arranged so as to overlap the second holding part 13B. The rotation axis J (refer to FIGS. 12A to 12E) of the first holding part 13A is arranged between the first holding part 13A and the second holding part 13B, which are arranged in parallel in the depth direction of the conductor forming apparatus 1. By rotating the first holding part 13A so as to overlap the second holding part 13B, the straight part 32 of the conductor 3 is folded.

The first holding part 13A can be moved in parallel in the width direction of the conductor forming apparatus 1 by an extension moving mechanism (not illustrated). The first holding part 13A, which has been rotated so as to overlap the second holding part 13B, is moved in parallel in the width direction by an extension moving mechanism, whereby a part that is not held by the first holding part 13A and the second holding part 13B in the straight part 32 of the conductor 3 is diagonally bent. As a result, a mountain-shaped turn part (hereinafter also referred to as the second turn part) is formed in the conductor 3 thus folded.

The folding jig 2 is arranged above the second holding part 13B. The rear end part 212 of the folding jig 2 is attached to a jig moving mechanism (not illustrated) arranged further behind the second holding part 13B. The folding jig 2 can slide between a folding operation position and a retraction position by the jig moving mechanism (not illustrated). The folding operation position is a position where the tip 211 is arranged between the first holding part 13A and the second holding part 13B, which are arranged in parallel in the depth direction of the conductor forming apparatus 1. The retraction position is a position further retreated behind the second holding part 13B. The folding jig 2, which has moved to the folding operation position, is arranged on the inside D of the folding direction of the conductor 3 (refer to FIGS. 12B to 12D and 13).

Figure 7:
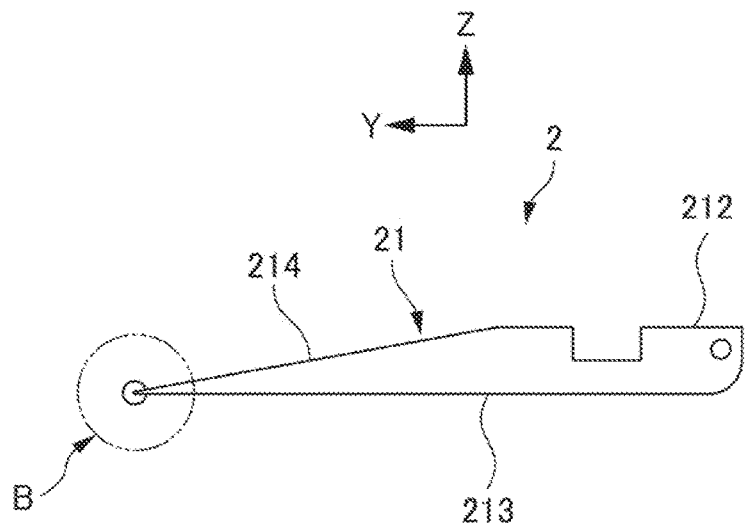
FIG. 7 is a side view illustrating a folding jig of the conductor forming apparatus.
Figure 8:
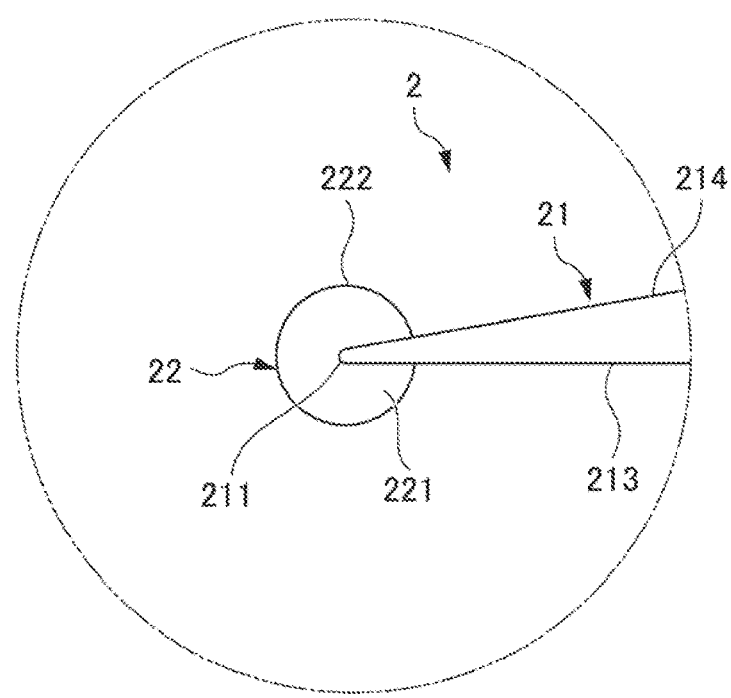
FIG. 8 is an enlarged view of a part B in FIG. 7.
Figure 9:
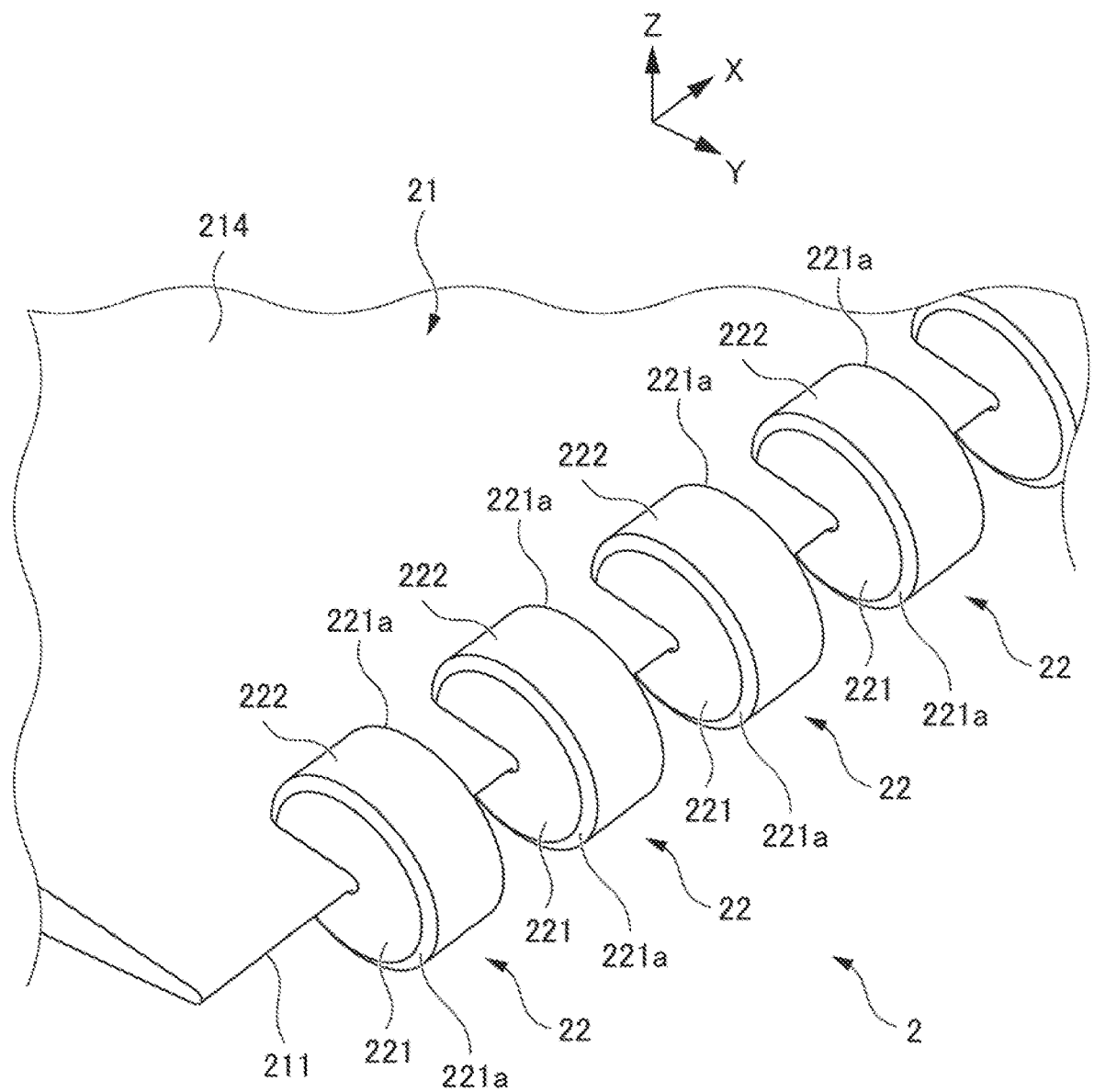
FIG. 9 is an enlarged perspective view illustrating the tip of the folding jig.

Referring to FIGS. 7 to 9, the folding jig 2 will be described in detail. The folding jig 2 is configured with a support plate 21 and a plurality of guide protrusions 22.

The support plate 21 is made of a rectangular plate-shaped member. The width of the plate-shaped member is approximately equal to the respective widths of the first holding part 13A and the second holding part 13B when the blocks 131 are closed. The lower surface 213 of the folding jig 2, which faces the upper surface of the second holding part 13B, is a plane arranged parallel to the upper surface of the second holding part 13B. The upper surface 214 of the support plate 21, extending from the rear end part 212 to the tip 211, is a plane that slopes downward towards the tip 211. This makes the support plate 21 wedge-shaped, gradually becoming thinner towards the tip 211. The tip 211 of the support plate 21 is chamfered or rounded, thus does not have sharp corners.

The guide protrusions 22, thirteen in total, are provided integrally with the support plate 21 and arranged at a certain distance apart on the tip 211 side of the support plate 21, corresponding to the width of the straight part 32 of the conductor 3. The guide protrusions 22 protrude further than the tip 211 of the support plate 21, to the lower surface 213 side of the support plate 21, and to the first holding part 13A side of the upper surface 214. As a result, the guide protrusions 22 include guide surfaces 221 between adjacent guide protrusions 22, 22, in which each of the guide surfaces 221 is composed of a plane for holding the straight part 32 of the pre-folding conductor 3 from both sides in the width direction.

In the present embodiment, as illustrated in FIG. 9, each guide protrusion 22 is formed in a substantially cylindrical shape. Therefore, the guide surfaces 221 of the guide protrusions 22 are formed in a substantially circular shape at both ends along the axis direction of the cylinder.

The guide protrusions 22 are arranged at the tip 211 of the support plate 21 such that the guide surfaces 221 face each other in parallel. The central axis of the substantially cylindrical guide protrusion 22 substantially aligns with the position of the tip 211, as illustrated in FIG. 8. As illustrated in FIGS. 8 and 9, the outer peripheral surface 222 of the guide protrusion 22 is arranged so as to connect the lower surface 213 and the upper surface 214 of the support plate 21 in an arc shape centered on the tip 211.

Note that the guide protrusions 22 provided integrally with the support plate 21 do not have a perfect cylindrical shape when viewed from the outside, and thus the term "substantially" is used to describe the guide protrusions 22 in this specification. However, the outer shape of the guide protrusions 22 is not limited to a substantially cylindrical shape, and may be, for example, a shape having a tapered shape of the outer peripheral surface of the cylinder.

The opposing pair of guide surfaces 221, 221 of adjacent guide protrusions 22 hold the straight part 32 of the conductor 3 from both sides in the width direction, whereby restraining the starting point near the folding, and guiding the folding operation of the straight part 32. The outer peripheral edge 221a of the guide surface 221 is chamfered or rounded, thus does not have sharp corners.

Figure 10:
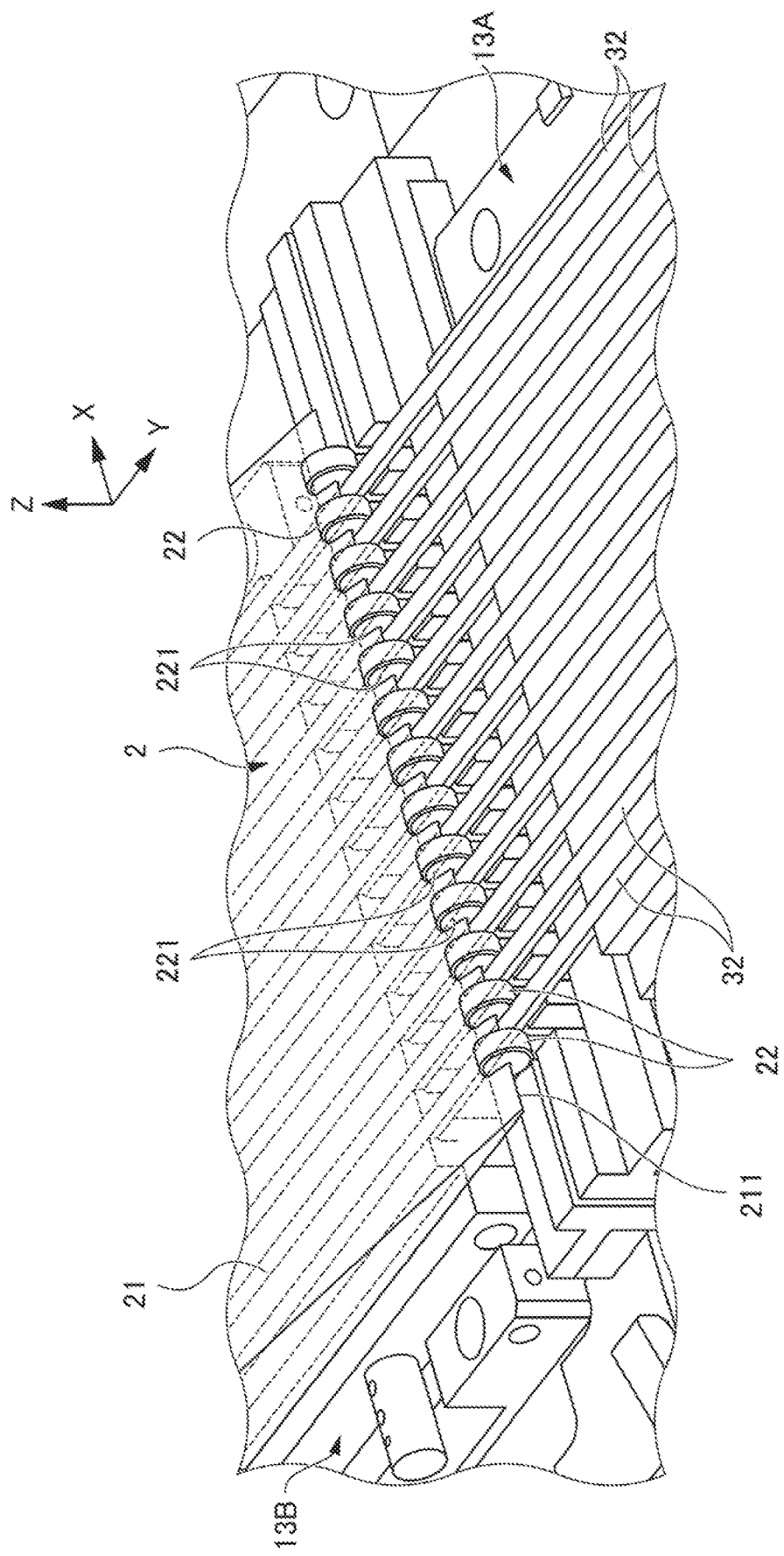
FIG. 10 is a perspective view illustrating a pre-folding conductor that is set in the conductor forming apparatus.
Figure 11:
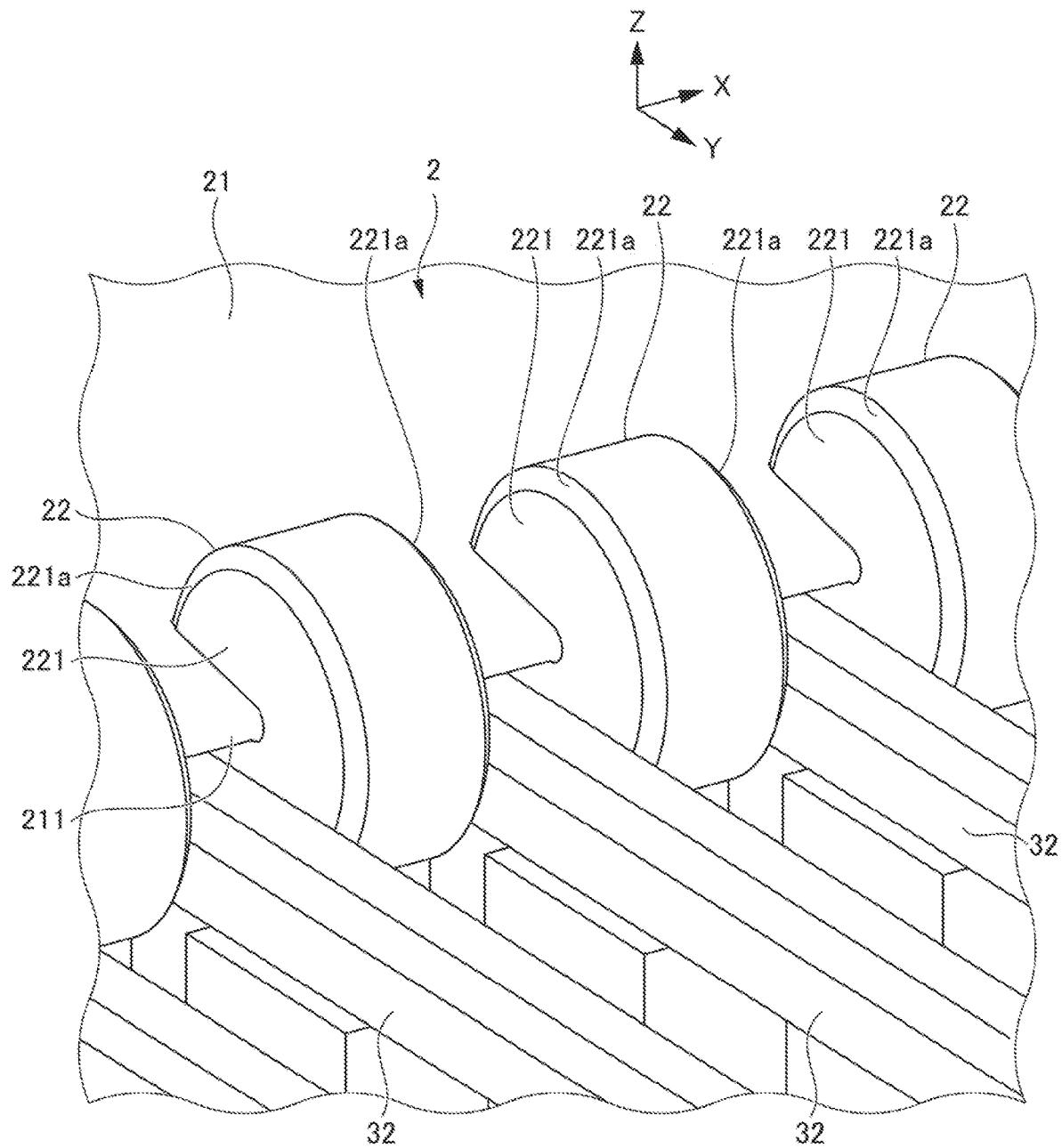
FIG. 11 is an enlarged perspective view illustrating the pre-folding conductor that is held between the guide protrusions of the folding jig.

As illustrated in FIGS. 10 and 11, after the straight part 32 of the conductor 3 is held by the first holding part 13A and the second holding part 13B, the folding jig 2 is moved by the jig moving mechanism (not illustrated) and arranged above the second holding part 13B. The guide protrusions 22 of the folding jig 2 are arranged between the first holding part 13A and the second holding part 13B, and the parallel straight parts 32 of the pre-folding conductor 3 are each held from both sides in the width direction by the guide surface 221 on the lower surface 213 side of the support plate 21. As a result, two pre-folding straight parts 32 are each arranged underneath the folding jig 2, between the opposing guide surfaces 221, 221 of the two adjacent guide protrusions 22.

Next, referring to FIGS. 12A to 12E and FIGS. 13 to 18, a specific example of a conductor forming method of forming a wave winding coil group from six conductors 3 using the conductor forming apparatus 1 will be described. In FIGS. 12A to 12E, only the first holding part 13A, the second holding part 13B, and the folding jig 2 of the conductor forming apparatus 1 are illustrated, and the straight parts 32 of the six parallel conductors 3 are schematically illustrated as a flat plate.

Figure 12A:
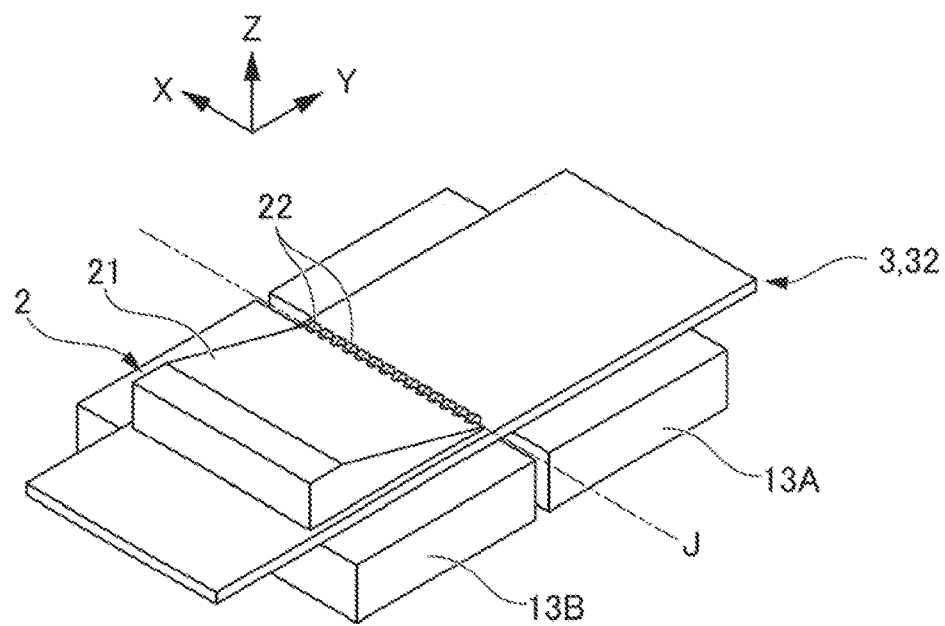
FIG. 12A is a schematic diagram illustrating the pre-folding state of the conductor.

First of all, as illustrated in FIG. 12A, in the state where the first holding part 13A and the second holding part 13B of the conductor forming apparatus 1 are arranged in the depth direction and hold the straight part 32 of the conductor 3, the folding jig 2 is moved by the jig moving mechanism (not illustrated) towards the first holding part 13A arranged above the second holding part 13B. As illustrated in FIGS. 10 and 11, the guide protrusions 22 of the folding jig 2 each hold the straight part 32 of the pre-folding conductor 3 arranged underneath the support plate 21, from both sides in the width direction with the guide surface 221. The position of the tip 211 substantially coincides with the rotation axis J of the first holding part 13A.

Figure 12B:
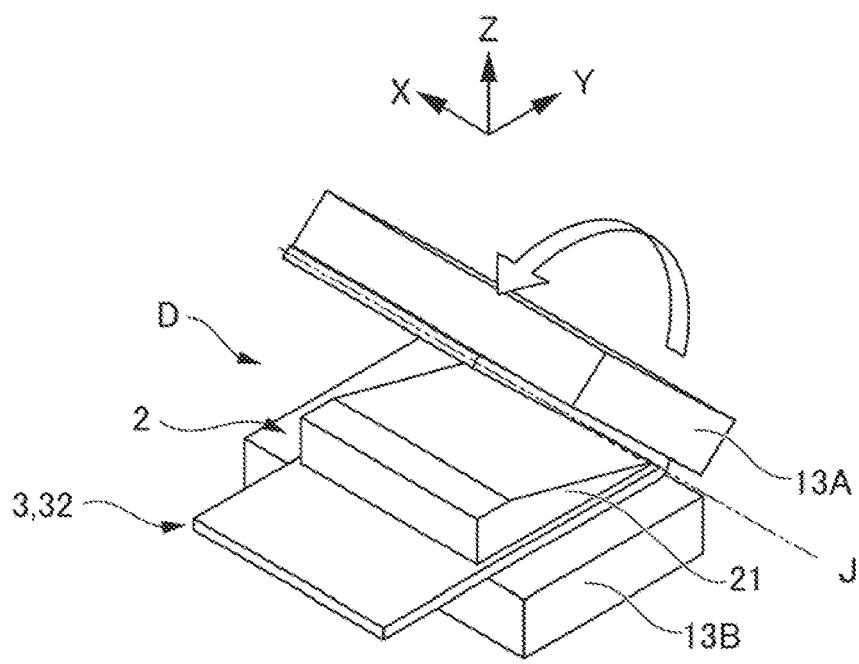
FIG. 12B is a schematic diagram illustrating the state of folding the conductor.
Figure 13:
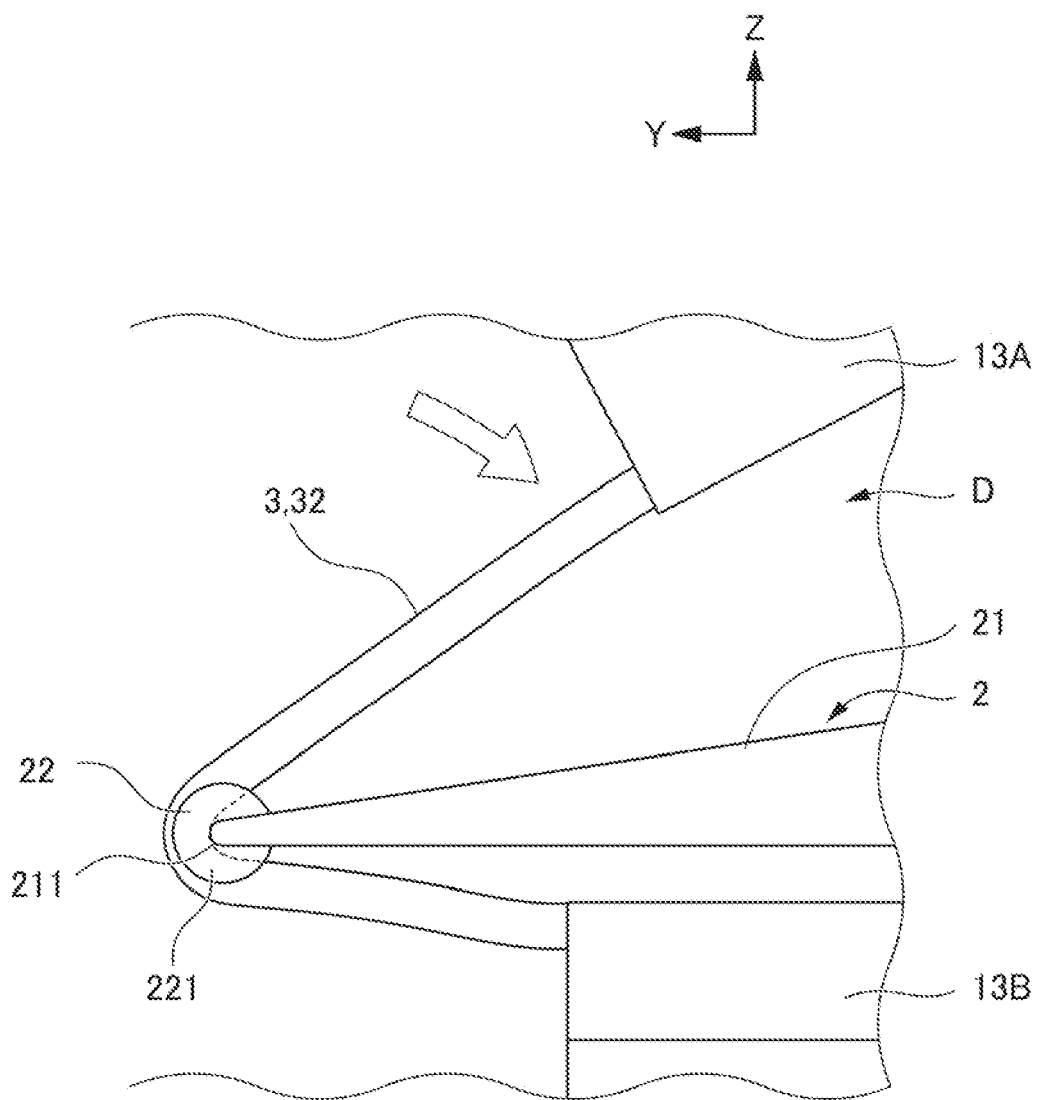
FIG. 13 is a side view illustrating the conductor being halfway folded and the folding jig.

Next, as illustrated in FIG. 12B, the first holding part 13A rotates so as to overlap the second holding part 13B around the rotation axis J using the folding moving mechanism (not illustrated). As a result, as illustrated in FIG. 13, the straight parts 32 of the conductor 3 are collectively folded back at the tip 211 of the folding jig 2 as the starting point for folding. The guide surfaces 221, 221 of the guide protrusions 22 of the folding jig 2, arranged on the inside D of the folding direction of the conductor 3, have been holding the straight part 32 from before folding, thus guiding the folding operation of the straight part 32 while holding it from the start of folding.

The tip 211 of the support plate 21, which serves as the starting point for folding, regulates the movement of the straight part 32 of the conductor 3 in the Y and Z directions during the folding operation. The tip 211 is chamfered or rounded, thus suppressing damage to the insulating film during the folding operation. Thereafter, as the rotation movement of the first holding part 13A proceeds, the straight part 32 held by the guide surfaces 221, 221 rubs against the guide surfaces 221 and is further folded back while being guided by the guide surfaces 221. The guide surface 221 of the guide protrusion 22 regulates the movement of the straight part 32 being folded, in the X direction.

Figure 12C:
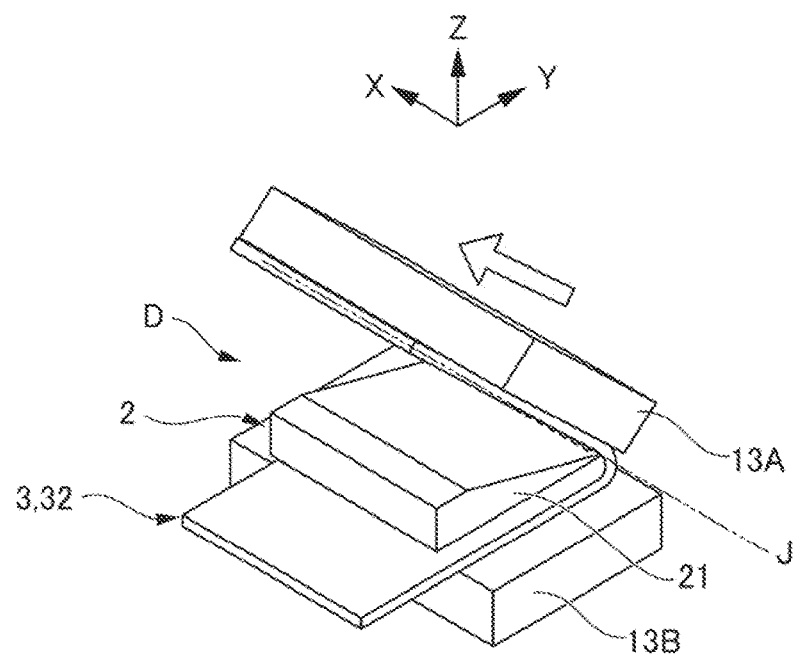
FIG. 12C is a schematic diagram illustrating the state where the conductor being halfway folded is moved in the parallel direction.

As illustrated in FIG. 12C, after the folding operation has proceeded halfway (for example, at an angle of approximately 150 degrees), the first holding part 13A moves a predetermined distance in parallel in the parallel direction (X direction) of the six conductors 3 by the extension moving mechanism (not illustrated). This causes a slight positional shift in the parallel direction of the conductor 3 between the straight part 32 held by the first holding part 13A and the straight part 32 held by the second holding part 13B. The straight part 32, which has been folded back halfway, inclines while a part held by the guide surfaces 221, 221 is serving as the top 321, and extends in the parallel direction of the conductor 3.

Figure 14:
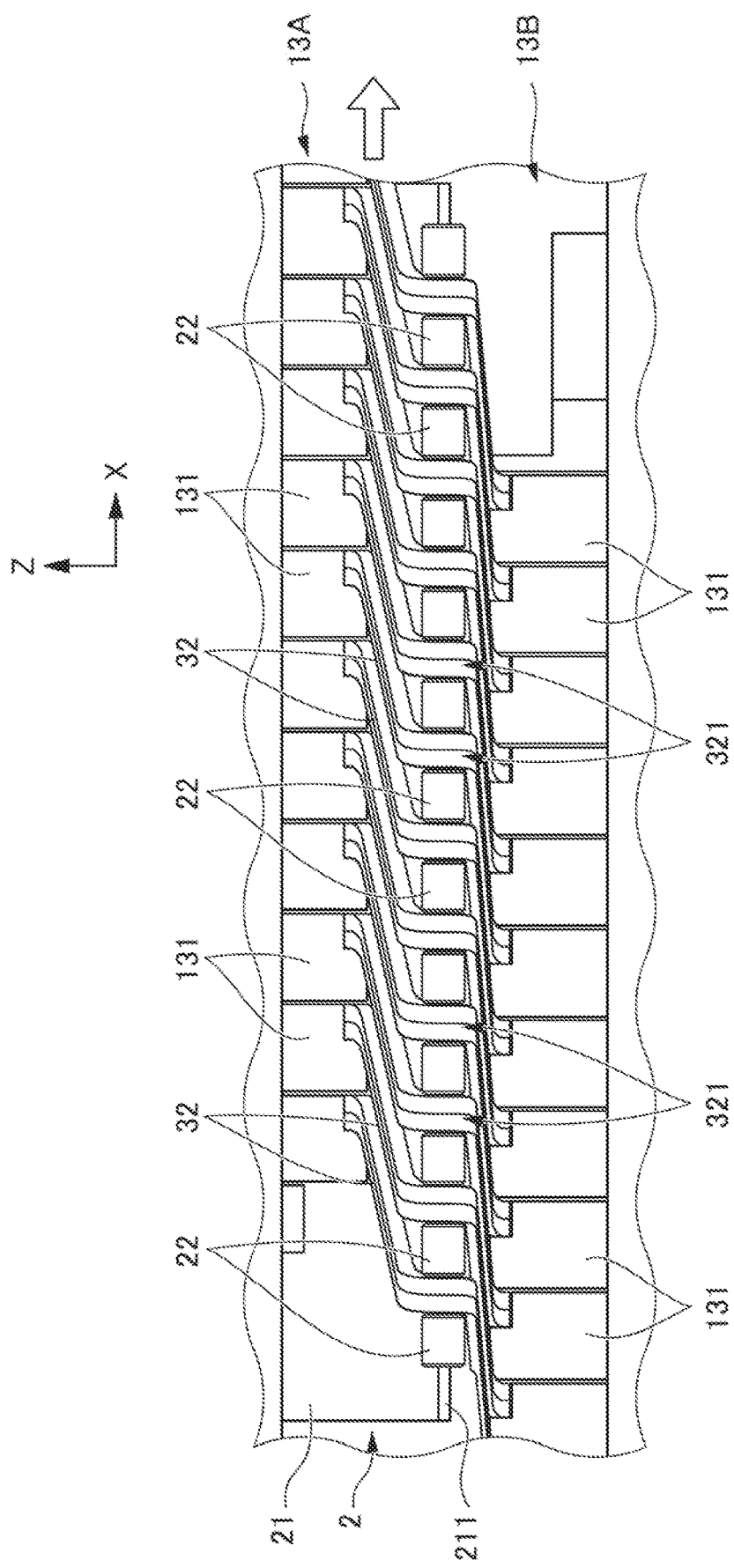
FIG. 14 is a front view illustrating the conductor and the folding jig moved in the parallel direction.
Figure 15:
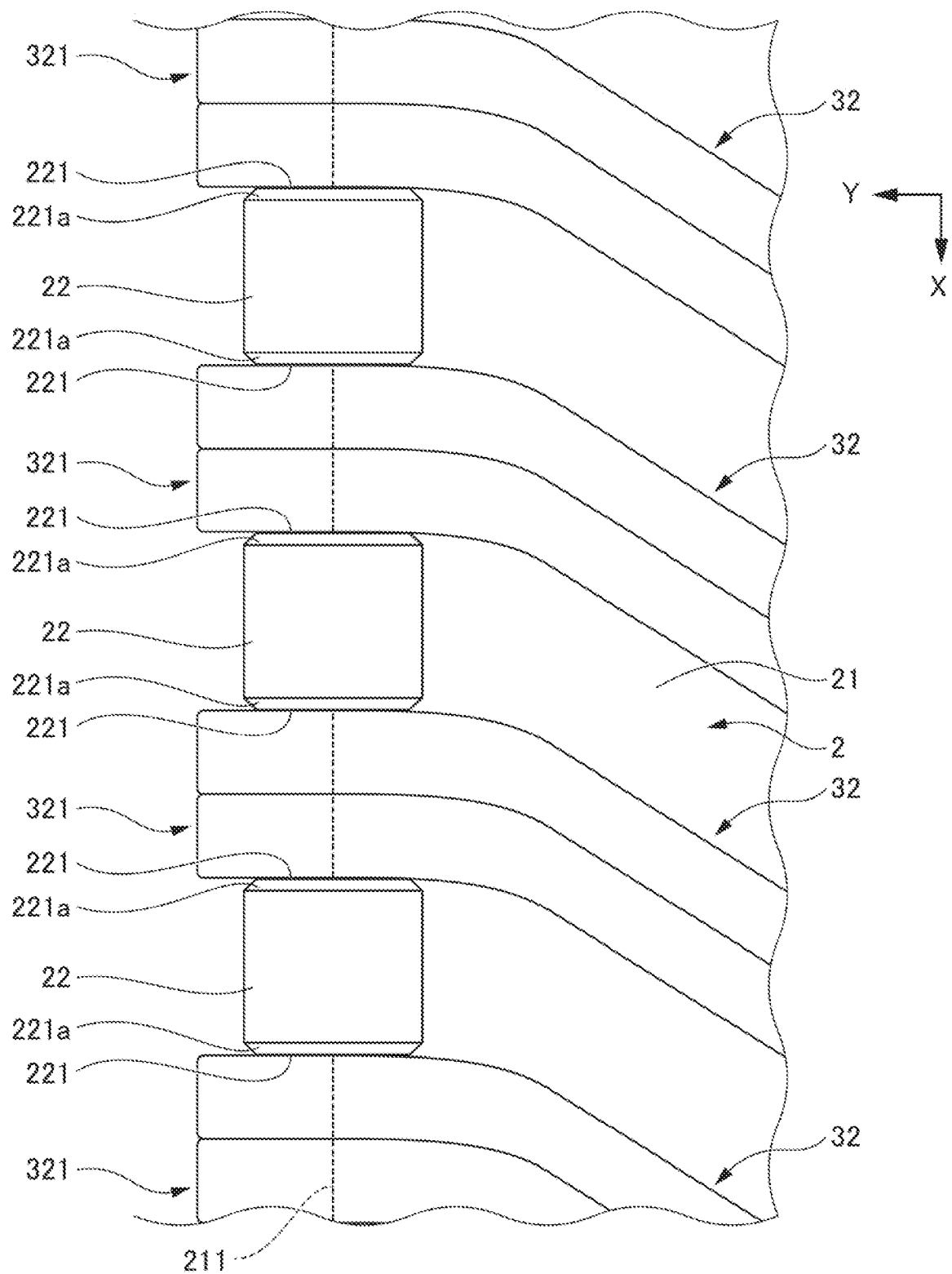
FIG. 15 is a plan view illustrating the conductor and the folding jig moved in the parallel direction.

As illustrated in FIGS. 14 and 15, the top 321 of the folding during the extending operation is held between the guide surfaces 221, 221 and continuously restrained. As a result, the top 321 does not shift or twist in the parallel direction of the conductor 3 and maintains a stable shape. The straight part 32, which is bent near the top 321, inclines while rubbing against the outer peripheral edge 221a of the guide surface 221. However, the outer peripheral edge 221a is chamfered or rounded, thus suppressing damage to the insulating film.

Figure 12D:
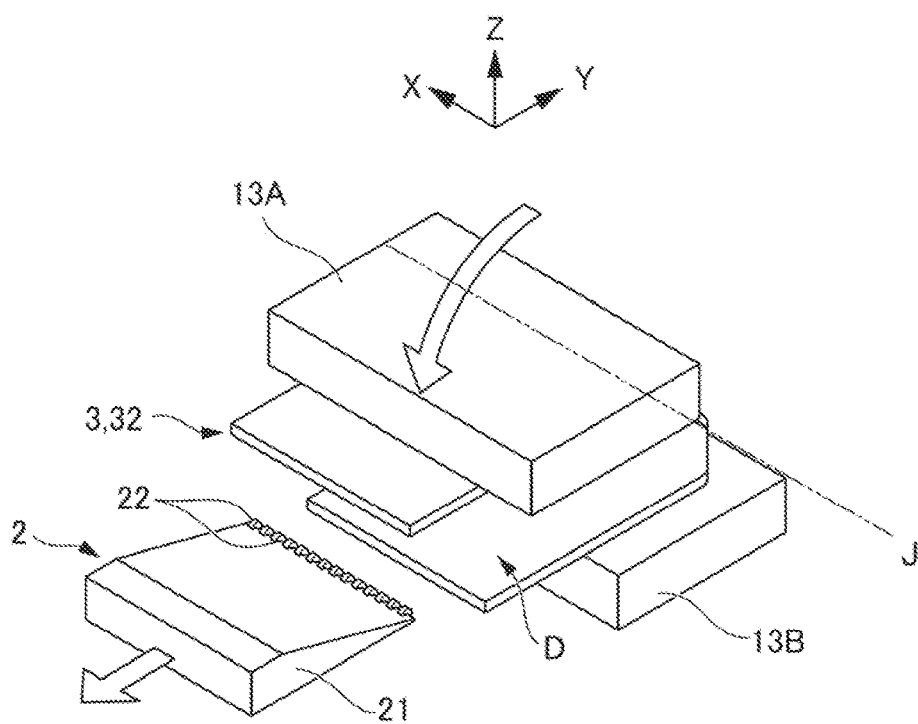
FIG. 12D is a schematic diagram illustrating the state of further folding the conductor having moved in the parallel direction.

Next, as illustrated in FIG. 12D, the folding jig 2 is moved to a retreat position towards the back of the conductor forming apparatus 1 by the jig moving mechanism (not illustrated), so as to move away from the first holding part 13A and the second holding part 13B. As a result, the folding jig 2 withdraws from the inside D of the folding direction of the conductor 3 and releases the guide for the conductor 3.

After the folding jig 2 retreats, the first holding part 13A further rotates so as to overlap the second holding part 13B by the folding moving mechanism (not illustrated). At this time, the conductor 3 thus folded already has the top 321 formed. Therefore, the conductor 3 is smoothly bent without shifting or twisting around the top 321. Thereafter, the first holding part 13A rotates until becoming substantially parallel with the second holding part 13B, at an angle of approximately 180 degrees.

Figure 16:
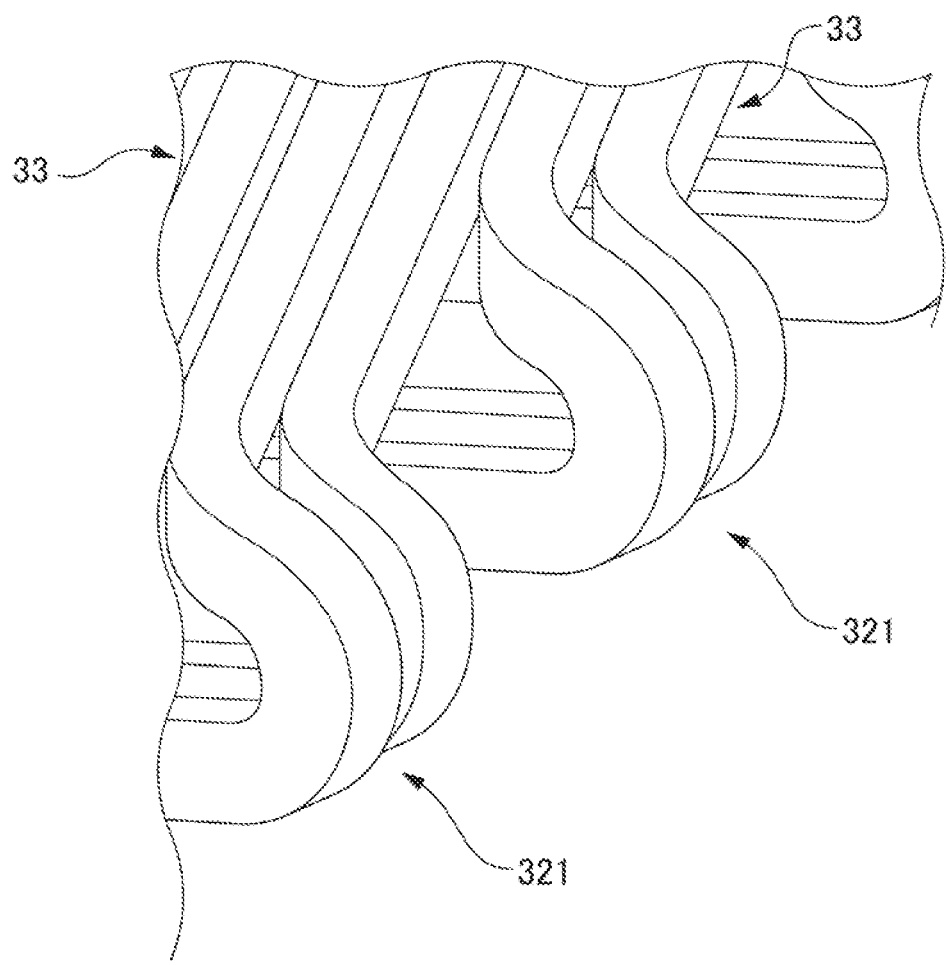
FIG. 16 is an enlarged perspective view illustrating the top of the turn part.
Figure 17:
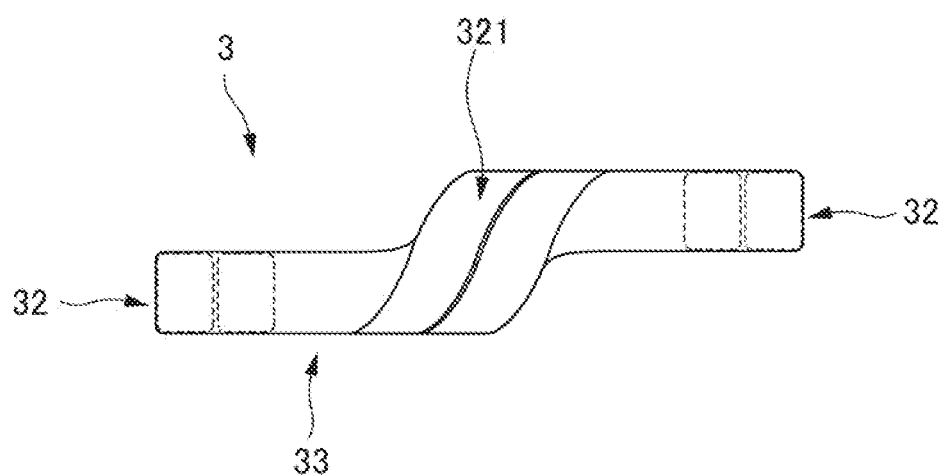
FIG. 17 is a diagram of the top of one turn part viewed from the extending direction of the straight part.

Afterwards, as illustrated in FIG. 12E, the first holding part 13A moves a predetermined distance parallel in the direction (X direction) of the conductor 3 by the extension moving mechanism (not illustrated). The folded conductor 3 further extends in the parallel direction (X direction). As a result, a turn part (second turn part) 33, which has the top 321 as its vertex, is collectively formed in the six conductors 3. Although the turn part 33 extends around the top 321, the top 321 maintains a stable shape due to continuous restriction by the guide surfaces 221, 221 of the guide protrusions 22 of the folding jig 2 from the start of folding, and is formed in a homogeneous shape without twisting, as illustrated in FIGS. 16 and 17.

Figure 18:
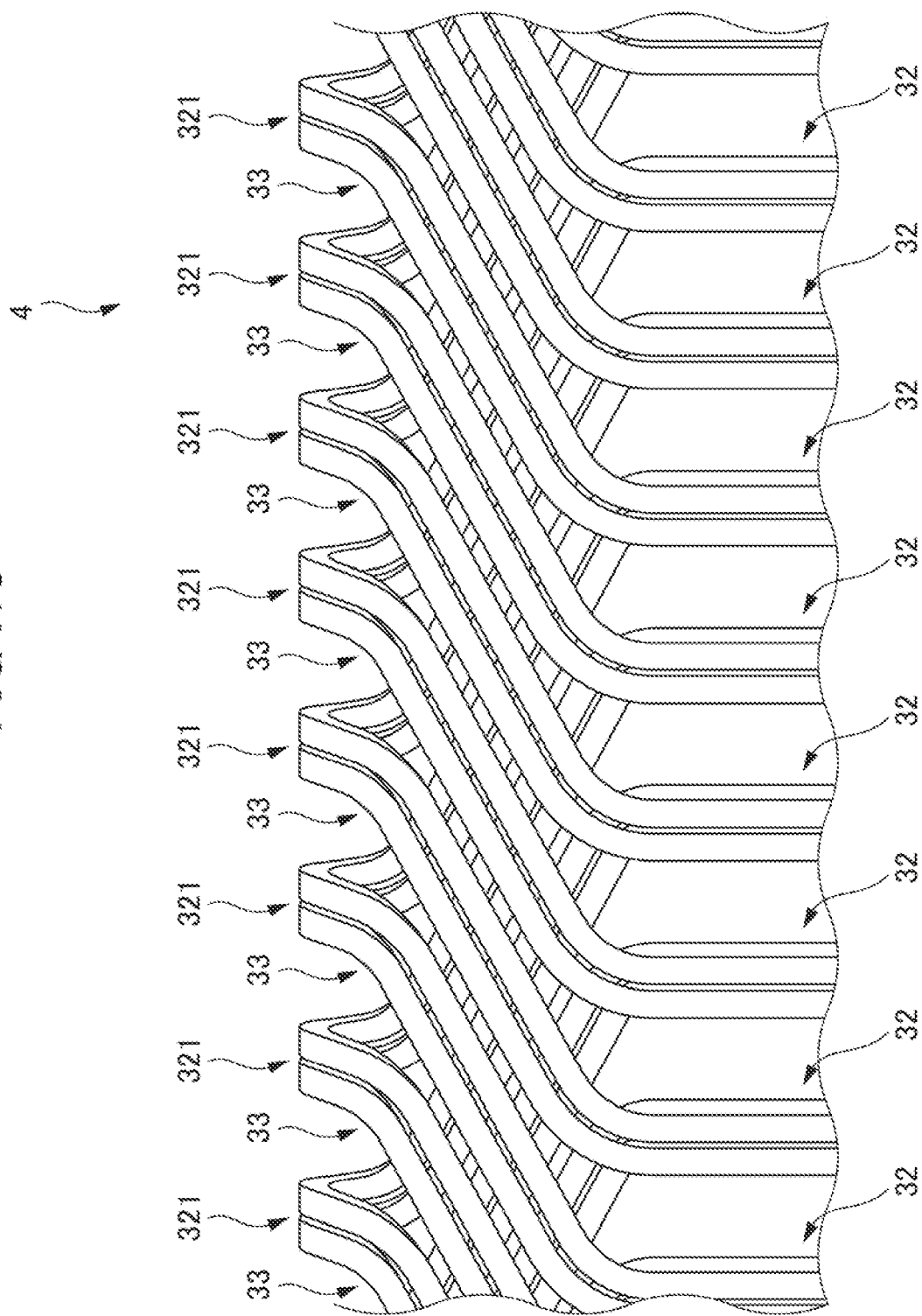
FIG. 18 is a diagram illustrating a wave winding coil group formed by the conductor forming apparatus.

The conductor forming apparatus 1 repeats the operations of: holding the straight part 32 of the conductor 3 by the first holding part 13A and the second holding part 13B; folding the conductor 3 by inserting the folding jig 2 into the inside D of the folding direction; and forming the second turn part 33 by moving the first holding part 13A in the parallel direction of the conductor 3, while sequentially changing the position of holding the straight part 32. As a result, as illustrated in FIG. 18, a wave winding coil group 4 is formed, in which six wave winding coils are stacked, each having the plurality of second turn parts 33 and the plurality of straight parts 32 inserted into the slots of the stator core (none of which are illustrated).

The following effects are achieved with the conductor forming apparatus 1 and the conductor forming method of the present embodiment.

The conductor forming apparatus 1 is a conductor forming apparatus that forms the wave winding coil group 4 by folding at least two parallel conductors 3, and includes the folding jig 2 arranged on the inside D of the folding direction of the conductor 3. The folding jig 2 includes: the support plate 21 with the tip 211 serving as the starting point for folding the conductor 3; and the plurality of guide protrusions 22 that are arranged on the tip 211 side of the support plate 21 so as to hold the pre-folding conductor 3 from both sides in the width direction and each include the guide surface 221 which can guide the folding operation of the conductor 3 from the start of the folding.

The conductor forming method forms the wave winding coil group 4 by folding at least two parallel conductors 3. The folding jig 2 includes: the support plate 21 with the tip 211 serving as the starting point for folding the conductor 3; and the plurality of guide protrusion 22 that are arranged on the tip 211 side of the support plate 21 so as to hold the pre-folding conductor 3 from both sides in the width direction and each include the guide surface 221 which can guide the folding operation of the conductor 3 from the start of folding. The folding jig 2 is arranged on the inside D of the folding direction of the conductor 3, and the conductor 3 is folded with the tip 211 of the support plate 21 serving as the starting point, while the guide surfaces 221 of the guide protrusions 22 guides the folding operation of the conductor 3 from the start of folding.

As a result, the guide surfaces 221 of the guide protrusions 22 of the folding jig 2 hold the straight part 32 of the pre-folding conductor 3, thus can continuously guide the folding operation of the conductor 3 from the start of folding. The guide protrusions 22 can guide the folding operation while controlling the straight part 32 of the conductor 3 with respect to the XYZ directions of the conductor forming apparatus 1. Therefore, a high-quality wave winding coil group with suppressed twisting of the conductor 3 can be formed.

In the conductor forming apparatus 1 and the conductor forming method, the guide surface 221 of the guide protrusion 22 is substantially circular. As a result, both sides of the conductor 3 can be continuously smoothly guided in the width direction during the folding operation of the conductor 3. Therefore, twisting of the conductor 3 can be reliably suppressed.

In the conductor forming apparatus 1 and the conductor forming method, the outer peripheral edge 221a of the guide surface 221 of the guide protrusion 22 is chamfered or rounded. As a result, when the conductor 3 is set between the guide protrusions 22, when the conductor 3 is folded, when the straight part 32 of the conductor 3 is moved in the width direction to form the second turn part 33, etc., damage to the insulating film of the conductor 3 by the outer peripheral edge 221a of the guide surface 221 is suppressed. Therefore, a high-quality wave winding coil group 4 with less damage to the insulating film can be formed.

In the conductor forming apparatus 1 and the conductor forming method, the tip 211 of the support plate 21 is chamfered or rounded. As a result, damage to the insulating film of the conductor 3 is suppressed when the conductor 3 is folded. Therefore, damage to the insulating film can be further reduced, and a further higher-quality wave winding coil group 4 can be formed.

EXPLANATION OF REFERENCE NUMERALS

1: conductor forming apparatus
2: folding jig
21: support plate
211: tip
22: guide protrusion
221: guide surface
221a: outer peripheral edge
3: conductor
4: wave winding coil group
D: inside of the folding direction

What is claimed is:

1. A conductor former that forms a wave winding coil group by folding a conductor, the conductor former comprising:

a folding jig that is arranged on an inside of a folding direction of the conductor,
the folding jig including
a support plate with a tip serving as a starting point for folding the conductor, and
a plurality of guide protrusions arranged on a side of the tip of the support plate so as to hold the conductor before folding from both sides in a width direction, the plurality of guide protrusions each including a guide surface that can guide a folding operation of the conductor from the start of folding.

2. The conductor former according to claim 1, wherein the guide surface of the guide protrusion is substantially circular.

3. The conductor former according to claim 2, wherein an outer peripheral edge of the guide surface of the guide protrusion is chamfered or rounded.

4. The conductor former according to claim 1, wherein the tip of the support plate is chamfered or rounded.

5. A conductor forming method of forming a wave winding coil group by folding a conductor, the method comprising:

arranging a folding jig on an inside of a folding direction of the conductor, the folding jig including a support plate with a tip serving as a starting point for folding the conductor, and a plurality of guide protrusions arranged on a side of the tip of the support plate so as to hold the conductor before folding from both sides in a width direction, the plurality of guide protrusions each including a guide surface that can guide a folding operation of the conductor from the start of folding; and
folding the conductor with the tip of the support plate as a starting point, and guiding the folding operation of the conductor from the start of folding by the guide surface of the guide protrusion.

6. The conductor forming method according to claim 5, wherein the guide surface of the guide protrusion is substantially circular.

7. The conductor forming method according to claim 6, wherein an outer peripheral edge of the guide surface of the guide protrusion is chamfered or rounded.

8. The conductor forming method according to claim 5, wherein the tip of the support plate is chamfered or rounded.

* * * * *